(12) United States Patent
Pfeilschifter et al.

(10) Patent No.: US 11,351,869 B2
(45) Date of Patent: *Jun. 7, 2022

(54) ALTERNATING-CURRENT CHARGING DEVICE FOR A MOTOR VEHICLE

(71) Applicant: Vitesco Technologies GmbH, Hannover (DE)

(72) Inventors: Franz Pfeilschifter, Munich (DE); Martin Götzenberger, Munich (DE); Klaus Mühlbauer, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/978,497

(22) PCT Filed: Feb. 26, 2019

(86) PCT No.: PCT/EP2019/054737
§ 371 (c)(1),
(2) Date: Sep. 4, 2020

(87) PCT Pub. No.: WO2019/170475
PCT Pub. Date: Sep. 12, 2019

(65) Prior Publication Data
US 2021/0008984 A1    Jan. 14, 2021

(30) Foreign Application Priority Data

Mar. 8, 2018 (DE) ............... 10 2018 203 499.0

(51) Int. Cl.
*B60L 3/04* (2006.01)
*B60L 53/14* (2019.01)
*B60L 53/22* (2019.01)
*H02J 7/06* (2006.01)

(52) U.S. Cl.
CPC ............ *B60L 3/04* (2013.01); *B60L 53/14* (2019.02); *B60L 53/22* (2019.02); *H02J 7/06* (2013.01);
(Continued)

(58) Field of Classification Search
CPC ........ B60L 3/04; B60L 53/14; B60L 2210/40; B60L 2210/10; B60L 2210/30; B60L 53/22; H02J 7/06; H02J 2207/20
(Continued)

(56) References Cited

U.S. PATENT DOCUMENTS 920,448 A     4/1990  Bonhomme ............... 361/102
2012/0212986 A1  8/2012  Minami .................. 363/126
(Continued)

FOREIGN PATENT DOCUMENTS

CN   106 160 525   11/2016  ............ H02M 7/217
DE   36 88 469     10/1993  ............ H01H 9/54
(Continued)

OTHER PUBLICATIONS

Search Report for International Application No. PCT/EP2019/054737, 25 pages, dated Jun. 4, 2019.
(Continued)

*Primary Examiner* — Sun J Lin
(74) *Attorney, Agent, or Firm* — Slayden Grubert Beard PLLC

(57) ABSTRACT

An alternating current (AC) charging device for a motor vehicle may include: a neutral conductor; a phase conductor; a rectifier; a smoothing capacitor electrically connected to the rectifier; a mains connection; a precharge circuit arranged between the mains connection and the smoothing capacitor, the precharge circuit precharging the smoothing capacitor; and a second phase conductor electrically connected to the phase conductor by a cross-connection line.
(Continued)

The neutral conductor and the phase conductor are connected to the rectifier. The precharge circuit is disposed in the neutral conductor.

14 Claims, 7 Drawing Sheets

(52) U.S. Cl.
CPC ....... *B60L 2210/10* (2013.01); *B60L 2210/30* (2013.01); *B60L 2210/40* (2013.01); *H02J 2207/20* (2020.01)

(58) Field of Classification Search
USPC .......................................................... 320/137
See application file for complete search history.

(56) References Cited

U.S. PATENT DOCUMENTS

| | | | | |
|---|---|---|---|---|
| 2012/0286720 A1 | 11/2012 | Fassnacht | ................... | 320/105 |
| 2012/0306264 A1 | 12/2012 | Komma | ...................... | 307/9.1 |
| 2019/0006951 A1 | 1/2019 | Huggenberger | ........ | H02M 7/04 |
| 2019/0034462 A1 | 1/2019 | Tazaki | ................. | H02M 7/062 |
| 2020/0406768 A1* | 12/2020 | Pfeilschifter et al. | .... | H02J 7/02 |
| 2021/0008984 A1* | 1/2021 | Pfeilschifter et al. | .. | B60L 53/14 |
| 2021/0155101 A1* | 5/2021 | Pfeilschifter et al. | .. | B60L 53/14 |

FOREIGN PATENT DOCUMENTS

| | | | | |
|---|---|---|---|---|
| DE | 10 2009 029 091 | 3/2011 | ................ | H02J 7/00 |
| DE | 10 2010 007 452 | 8/2011 | ............. | H03K 17/00 |
| DE | 10 2011 016 532 | 6/2012 | ............. | G01R 31/41 |
| DE | 10 2016 009 655 | 4/2017 | ............. | G06N 3/02 |
| WO | 2017 093273 | 6/2017 | ............. | H02M 1/10 |
| WO | 2017 159078 | 9/2017 | ............. | H02M 7/06 |

OTHER PUBLICATIONS

Office Action for DE Patent Application No. 10 2018 203 499.0, 7 pages, dated Dec. 11, 2018.

* cited by examiner

ALTERNATING-CURRENT CHARGING DEVICE FOR A MOTOR VEHICLE

CROSS-REFERENCE TO RELATED APPLICATIONS

This application is a U.S. National Stage Application of International Application No. PCT/EP2019/054737 filed Feb. 26, 2019, which designates the United States of America, and claims priority to DE Application No. 10 2018 203 499.0 filed Mar. 8, 2018, the contents of which are hereby incorporated by reference in their entirety.

TECHNICAL FIELD

The present disclosure relates to motor vehicles. Various embodiments include an AC charging device for a motor vehicle, which has a neutral conductor in which a precharge circuit is provided.

BACKGROUND

AC charging devices are known. An AC charging device may be used to supply energy to an on-board power system of a motor vehicle, or else to charge a traction battery of the motor vehicle. The AC charging device is designed to receive AC current from a mains and (by rectifying the AC current) to output DC current to an on-board power system of a motor vehicle. The AC charging device usually has at least one smoothing capacitor.

The smoothing capacitor reduces any residual ripple or an AC current component that remains after the AC current has been rectified. The smoothing capacitor is usually precharged by a precharge circuit before a mains disconnection contactor, which establishes a connection between a mains and the smoothing capacitor, is closed. The precharge circuit in this case usually has just one precharge resistor in order to limit the current. As a result of the precharging, the smoothing capacitor is usually brought to the voltage level of the mains with a delay. The precharge circuit thus avoids an abrupt breakdown of the voltage of the mains on the smoothing capacitor. One disadvantage of the known precharge circuit is that a respective precharge circuit is usually arranged in all of the phase conductors of the AC charging device.

SUMMARY

The teachings of the present disclosure include AC charging devices and methods by way of which or in the case of which an AC charging device is able to be designed more simply. For example, some embodiments include an AC charging device (2) for a motor vehicle (1), having a neutral conductor (6), at least one phase conductor (7, 8, 9), and at least one rectifier (13, 18), wherein the neutral conductor (6) and the phase conductor (7, 8, 9) are connected to the rectifier (13, 18) and a smoothing capacitor (14, 16) is furthermore electrically connected to the rectifier (13, 18), wherein the AC charging device (2) furthermore has a precharge circuit (37) arranged between a mains connection (33, 34, 35, 36) of the AC charging device (2) and the smoothing capacitor (14, 16, 19), which precharge circuit is designed to precharge the smoothing capacitor (14, 16), wherein the phase conductor (7) and at least one further phase conductor (8, 9) of the AC charging device (2) are electrically connected by way of a cross-connection line (25, 28), characterized in that the precharge circuit (37) is arranged in the neutral conductor (6).

In some embodiments, the precharge circuit (37) has at least one transistor (22) and one precharge resistor (21) that are connected in series.

In some embodiments, the precharge circuit (37) has a series-connected diode (23).

In some embodiments, the cross-connection line (25, 28) has a cross-connection switch (26, 29) for disconnecting the phase conductor (7) and the further phase conductor (8, 9).

In some embodiments, a further precharge circuit, designed identically to the precharge circuit (37), is formed in the cross-connection line (25, 28) or in a phase conductor (7).

In some embodiments, the AC swcharging device (2) has a mains disconnection contactor (38, 31, 32) between the mains connection (33, 34, 35, 36) and the rectifier (13, 18) and a mains disconnection circuit (39) formed in parallel with the mains disconnection contactor (38, 31, 32).

In some embodiments, the precharge circuit (37) is formed in parallel with the mains disconnection contactor (38, 31, 32).

In some embodiments, the precharge circuit (37) is formed in parallel with the mains disconnection circuit (39).

In some embodiments, the mains disconnection circuit (39) has two semiconductor elements (40, 41, 45).

In some embodiments, the semiconductor elements of the mains disconnection circuit (39) are designed as two transistors (40, 41) connected to one another in antiseries.

In some embodiments, one semiconductor element of the two semiconductor elements of the mains disconnection circuit (39) is designed as a diode (45).

In some embodiments, the precharge circuit (37) is electrically connected to a connection point (44) between the two semiconductor elements (40, 41, 45) of the mains disconnection circuit (39).

In some embodiments, the AC charging device (2) has a further mains disconnection contactor (42) between the mains connection (33, 34, 35, 36) and the rectifier (13, 18) and has a further mains disconnection circuit (43) formed in parallel with the further mains disconnection contactor (42), and the further mains disconnection contactor (42) is formed in series with the precharge circuit (37).

As another example, some embodiments include a method for operating an AC charging device (2) for a motor vehicle (1), in which the following steps are performed: opening a mains disconnection contactor (38, 31, 32) of the AC charging device (2), which electrically connects a mains (3) to a rectifier (13, 18) of the AC charging device (2), if the mains disconnection contactor (38, 31, 32) is not open; applying voltage from the mains (3) to the AC charging device (2), wherein a phase conductor (7) of the AC charging device (2) and at least one further phase conductor (8, 9) of the AC charging device (2) are electrically connected to one another by way of a cross-connection line (25, 28); precharging a smoothing capacitor (14, 16, 19) of the AC charging device (2) through a precharge circuit (37) arranged in a neutral conductor (6) of the AC charging device (2); and closing the mains disconnection contactor (38, 31, 32) if the smoothing capacitor (14, 16, 19) is precharged.

BRIEF DESCRIPTION OF THE DRAWINGS

Further features of the teaching herein emerge from the claims, the figures, and the description of the figures. Exemplary embodiments of the teachings will be explained in more detail below on the basis of schematic drawings. In the figures:

DETAILED DESCRIPTION

Figure 1:
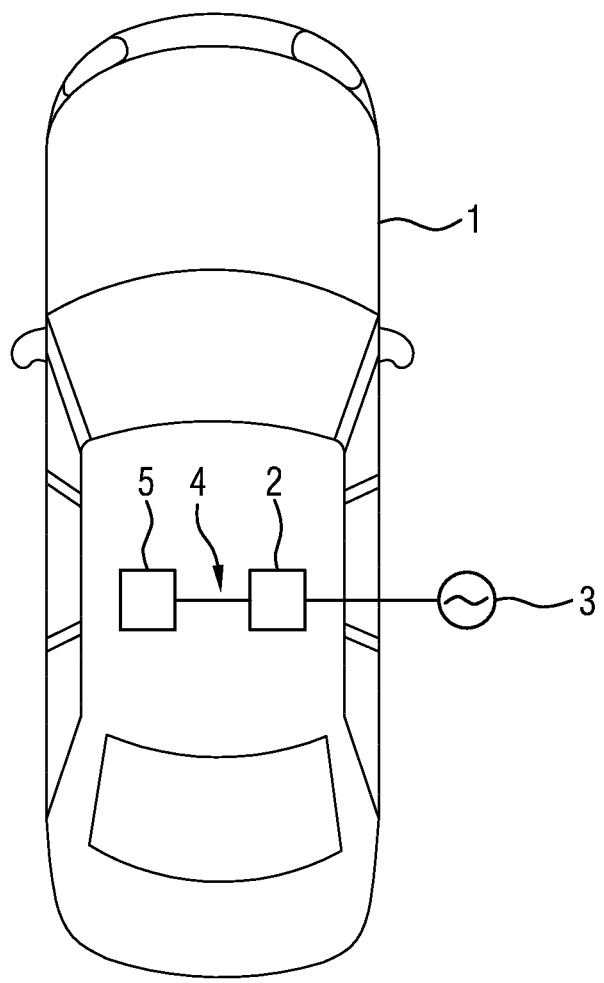
FIG. 1 shows a schematic top-down illustration of a motor vehicle with an AC charging device incorporating teachings of the present disclosure.

In some embodiments, an AC charging device incorporating teachings of the present disclosure for a motor vehicle has a neutral conductor, at least one phase conductor, in particular three phase conductors, and at least one in particular passive rectifier. The neutral conductor and the phase conductor are connected to the rectifier, in particular to the AC side thereof. At least one smoothing capacitor is electrically connected to the DC side of the rectifier. The rectifier connects the smoothing capacitor to the phase conductors or the neutral conductor.

The AC charging device furthermore has a precharge circuit. The precharge circuit is arranged between a mains connection of the AC charging device and the smoothing capacitor, e.g. with the first smoothing capacitor as viewed from the mains connection of the phase conductor. The precharge circuit is designed to precharge the smoothing capacitor, in particular passively, meaning that the precharge circuit in some embodiments does not have a current source or a converter. The phase conductor and at least one further phase conductor of the AC charging device are furthermore connected by way of a cross-connection line. The cross-connection line is switchable.

In some embodiments, the precharge circuit is arranged in particular only in the neutral conductor. The precharge circuit in the neutral conductor may be the sole precharge circuit of the charge circuit that is present between the rectifier and the mains connection. The AC charging device is able to be designed more simply if the precharge circuit is arranged in the neutral conductor. Only one precharge circuit is then necessary in order to limit the precharge current, by way of which the smoothing capacitors of the various phases are precharged.

By arranging the precharge circuit in the neutral conductor, the at least one precharge circuit in the phase conductor or in the cross-connection line may be dispensed with. By arranging the precharge circuit in the neutral conductor, only a single precharge circuit is then sufficient to be able to safely operate the AC charging device with three branches and, for example, only one phase conductor connected to the mains. By arranging the precharge circuit in the neutral conductor, it is thus possible in particular to save on two precharge circuits that are usually additionally required.

In some embodiments, the AC charging device comprises a three-phase current charging device. The AC charging device thereby in particular has three phase conductors. Each of the phase conductors may have the precharge circuit with the transistor. This means that the mains connection of each individual phase conductor is able to be switched to a voltage-free state if the mains connection is not connected to the mains.

In some embodiments, the AC charging device comprises at least one cross-connection line, such that at least two phase conductors are connected (switchably) to one another via the cross-connection line. This may be advantageous since a plurality of branches of the AC charging device may be used by the cross-connection line, even if the AC charging device is connected to the mains only via a single phase conductor.

In some embodiments, the precharge circuit in particular has at least one precharge resistor. The precharge circuit may be connected in parallel with a mains disconnection contactor. The precharge circuit bypasses this contactor. The precharge resistor is connected in series. In some embodiments, the precharge circuit includes a switch, in particular a semiconductor switch in the form of a transistor. The transistor is connected in series with the precharge resistor. The resultant series circuit bypasses the mains disconnection contactor or is connected in parallel therewith. The precharge circuit thus has a switchable precharge resistor. When the contactor is open, the precharge circuit forms the sole current path between the mains connection and the rectifier. The precharge circuit is switchable and configured so as to disconnect the rectifier or the smoothing capacitor completely from the mains connection in the open switching state.

When a voltage is applied to the mains connection via the mains, the smoothing capacitor is therefore first of all precharged via the precharge circuit, in particular via the closed transistor and the precharge resistor (connected in series therewith). The mains disconnection contactor of the phase conductor is open during the precharging. The mains disconnection contactor is preferably closed only when the smoothing capacitor has been sufficiently precharged via the precharge circuit.

In some embodiments, the precharge circuit includes at least one normally off or self-blocking transistor. As a result of the transistor, the mains connection of the AC charging device is able to be switched to a voltage-free state. The transistor may be furthermore advantageous since otherwise, when a cross-connection switch of the cross-connection line is closed, there may be a mains short-circuit across a precharge resistor, so to speak. The motor vehicle is thereby able to be operated more safely.

In some embodiments, the precharge circuit includes a diode arranged upstream of the transistor, in particular with respect to the smoothing capacitor. The diode is designed to be blocking in the direction from the in particular passive rectifier to the mains connection. The diode and inverse diode of the transistor are connected in antiseries. The diode makes it possible to prevent current from flowing back via the precharge circuit, that is to say from the smoothing capacitor in the direction of the mains connection, as triggered by the mains curve. Even when the transistor is closed, no current is able to flow back through the diode from the smoothing capacitor in the direction of the mains connection via the precharge circuit. The AC charging device is thereby able to be operated more safely. The AC charging device may furthermore thereby be designed in a simple manner with the cross-connection lines. Instead of the diode, it is possible to use a further transistor whose inverse diode has the properties of the diode, in particular with regard to the reverse direction and the connection within the precharge circuit.

In some embodiments, the cross-connection line has a cross-connection switch for disconnecting the phase conductor and the further phase conductor. The phase conductors may be connected to one another through the cross-connection line. The connection is provided in particular when only one of the phase conductors is connected to the mains, but a plurality of branches of the AC charging device are intended to be used for charging. Charging is thus able to be performed through the cross-connection line even with a current strength greater than 16 A, for example, since each individual branch of the AC charging device is designed only for a maximum of 16 A, for example.

It may, for example, be the case that the correct charging connection is not available to connect the mains connection of the AC charging device to more than one phase conductor. The mains is then thus electrically connected only to a single mains connection, in particular of the first phase conductor. The current strength with which the on-board power system of the motor vehicle is supplied, in particular with which a battery of the motor vehicle is charged, may however be charged with preferably three times 16 A despite the mains connection to only one mains connection of the phase conductor or one pin of a plug connection of the AC charging device.

In some embodiments, there is a further precharge circuit, designed identically to the precharge circuit, formed in the cross-connection line. A smoothing capacitor from a second branch of the AC charging device and/or a smoothing capacitor from a third branch of the AC charging device may then also be precharged more safely by the further precharge circuit. The further precharge circuit may thus for example be used as a replacement or as a support if the precharge circuit in the neutral conductor is defective. In some embodiments, the cross-connection line includes the cross-connection switch, which may be formed in parallel with the further precharge circuit. The cross-connection line may be interrupted by the cross-connection switch.

In some embodiments, the AC charging device includes a mains disconnection contactor between the mains connection and the in particular passive rectifier and a mains disconnection circuit formed in parallel with the mains disconnection contactor. The mains disconnection circuit is configured so as to hold the transient current during switching procedures. In other words, the mains disconnection contactor is thereby able to be closed downstream of the mains disconnection switch and open upstream thereof, such that the loading caused by the switching procedures takes place primarily in the mains disconnection circuit and not in the mains disconnection contactor.

As a result of the mains disconnection circuit arranged in parallel with the mains disconnection contactor, an arc extinguishing chamber may be dispensed with. The mains disconnection contactor may thus be formed without the arc extinguishing chamber due to the mains disconnection circuit. In electrical power engineering, the arc extinguishing chamber is a device for extinguishing sparks of switching arcs as occur when high electric currents are switched off, typically in the event of an electrical short circuit.

When switching off high currents, a switching arc occurs between the contacts when the contacts are separated. This arc, formed from ionized air, leads to contact erosion even when the contacts are separated as quickly as possible, and has to be extinguished or deionized as quickly as possible in order to avoid consequential damage. As a result of the mains disconnection circuit, the contacts may however be separated without de-ion chambers. The mains disconnection circuit is thus closed for this purpose. The mains disconnection contactor may then be opened without causing a switching arc, since the current is able to flow away through the mains disconnection circuit. If the mains disconnection contactor and the mains disconnection circuit are closed at the same time, then the current flows in particular essentially through the mains disconnection contactor and not through the higher-resistance mains disconnection circuit. The mains disconnection contactor may have a lower resistance than the mains disconnection circuit.

In some embodiments, the precharge circuit may be in parallel with the mains disconnection contactor. As a result of the arrangement of the precharge circuit in parallel with the mains disconnection contactor, the smoothing capacitor may be precharged with energy from the mains via the precharge circuit if the mains disconnection contactor and/or the mains disconnection circuit is open.

In some embodiments, the precharge circuit may be in parallel with the mains disconnection circuit. As a result of the arrangement of the precharge circuit in parallel with the mains disconnection circuit, the smoothing capacitor may also be precharged with energy from the mains via the precharge circuit if the mains disconnection circuit is open.

In some embodiments, the mains disconnection circuit may have two semiconductor elements. The inverse diodes thereof may be oriented counter to one another. The semiconductor elements may be connected in series with one another. The two semiconductor elements make the mains disconnection circuit safer and more reliable. The AC charging device is thereby able to be operated more safely.

In some embodiments, the semiconductor elements of the mains disconnection circuit may be connected as two transistors connected to one another in antiseries. It is thus possible to achieve a situation whereby the current is also able to flow in the direction of the mains connection downstream of the mains disconnection circuit.

In some embodiments, one semiconductor element of the two semiconductor elements of the mains disconnection circuit may include a diode. The mains disconnection circuit is able be designed more inexpensively as a result of the diode. The power switching of the mains disconnection circuit may then however only be possible for one half-cycle (either positive half-cycle or negative half-cycle).

In some embodiments, the precharge circuit may be electrically connected, in particular directly, to a connection point between the two semiconductor elements of the mains disconnection circuit. The precharge circuit is thereby connected in series with one of the semiconductor elements of the mains disconnection circuit. It is thereby possible to save on a diode of the precharge circuit, and the precharge circuit may be designed without a diode.

In some embodiments, the AC charging device may have a further mains disconnection contactor between the mains connection and the rectifier and a further mains disconnection circuit formed in parallel with the mains disconnection contactor, and for the further mains disconnection contactor to be formed in series with the precharge circuit. An emergency shutdown or an emergency disconnection of the connection between the AC charging device and the mains is able to take place reliably as a result of the further mains disconnection contactor and the further mains disconnection circuit. The emergency disconnection device is thus designed to be redundant.

It may thus for example be the case that the mains disconnection contactor cannot be opened because the contacts of the mains disconnection contactor are inseparably connected to one another. This may occur for example if the mains disconnection contactor becomes stuck, for example if one or more contacts of the mains disconnection contactor are unintentionally welded together. In this case in particular, it is advantageous to be able to use the further mains disconnection contactor in series with the mains disconnection contactor to interrupt the voltage or to disconnect the mains. The further mains disconnection contactor may also be designed without an arc extinguishing chamber as a result of the further mains disconnection circuit.

Also described are methods in which an AC charging device for a motor vehicle is operated. In some embodiments, the following steps are performed:

opening a mains connection switch of the AC charging device, which electrically connects a mains to an in particular passive rectifier of the AC charging device, in particular directly, if the mains connection switch is not open;

applying voltage from the mains to the AC charging device, wherein a phase conductor of the AC charging device and at least one further phase conductor of the AC charging device are electrically connected to one another by way of a (preferably switchable) cross-connection line;

precharging a smoothing capacitor of the AC charging device through a precharge circuit arranged in a neutral conductor of the AC charging device; and closing the mains connection switch if the smoothing capacitor is precharged.

Various embodiments of the AC charging device according to the teachings herein should be regarded as variant embodiments of the methods taught herein. The relevant components of the AC charging device are each designed to perform the respective method steps.

In the figures, identical or functionally identical elements are provided with identical reference signs.

FIG. 1 shows a schematic top-down illustration of a motor vehicle 1 with an AC charging device 2. In the exemplary embodiment shown, the AC charging device 2 is in the charging state and is connected to a mains 3. The mains 3 provides AC current. The AC charging device is furthermore electrically connected to a traction battery 5 of the motor vehicle 1 via an on-board power system 4 of the motor vehicle 1. As shown, the on-board power system 4 is designed as a high-voltage on-board power system of for example 400 V.

Figure 2:
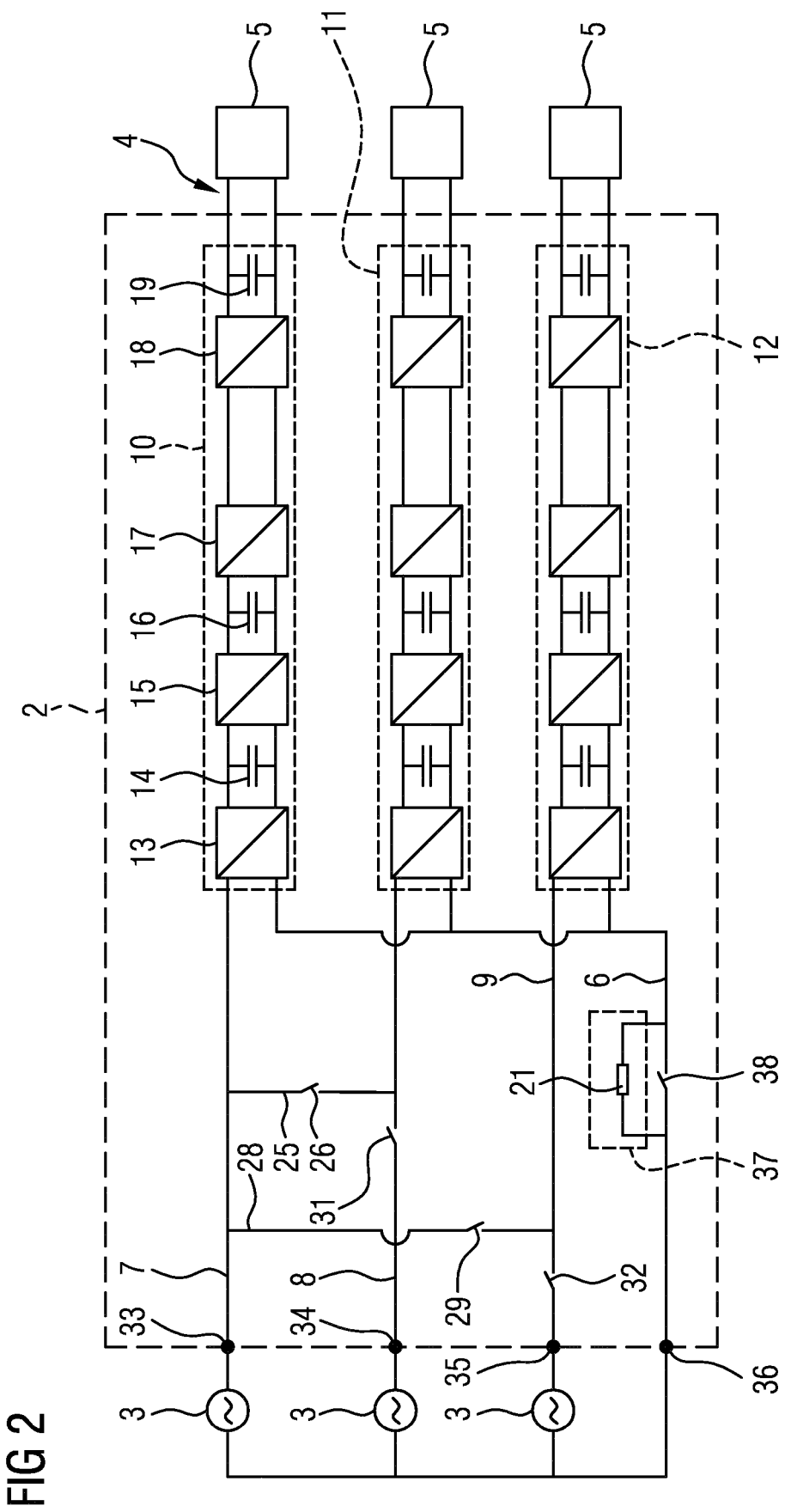
FIG. 2 shows an exemplary embodiment of an AC charging device incorporating teachings of the present disclosure with two cross-connection lines each with a cross-connection switch and a precharge circuit in a neutral conductor of the AC charging device.

FIG. 2 shows an example AC charging device 2. The AC charging device 2 has a neutral conductor 6, a first phase conductor 7, a second phase conductor 8 and a third phase conductor 9. The neutral conductor 6 and the first phase conductor 7 are electrically connected to the mains 3. As shown, the second phase conductor 8 and the third phase conductor 9 are on the other hand connected to the mains 3 not directly, but rather in particular only via the first phase conductor 7.

The first phase conductor 7 is electrically connected to a first branch 10 of the AC charging device 2. The second phase conductor 8 is directly electrically connected to a second branch 11 of the AC charging device 2. The third phase conductor 9 is directly electrically connected to a third branch 12 of the AC charging device 2. As shown, the first branch 10 is designed identically to the second branch 11 or to the third branch 12. The first branch 10 is described below as an example for the other two branches 11, 12.

The first branch 10 of the AC charging device has a first passive rectifier 13, a first smoothing capacitor 14, a DC-to-DC voltage converter 15, a second smoothing capacitor 16, an inverter 17, a second rectifier 18 and a third smoothing capacitor 19. The smoothing capacitor is connected to the mains connection via the rectifier. A transformer may be arranged between the inverter 17 and the second rectifier 18. The transformer may lead to galvanic isolation between the mains 3 and the on-board power system 4. However, the AC charging device may have no transformer, as a result of which the mains 3 and the on-board power system 4 are galvanically connected.

In some embodiments, a precharge circuit 37 is arranged in the neutral conductor 6. As shown, the precharge circuit 37 comprises a precharge resistor 21. In some embodiments, the precharge circuit 37 also comprises a normally off transistor 22 and a diode 23. The forward direction of the diode 23 runs from the mains 3 to the first smoothing capacitor 14.

The first smoothing capacitor 14 and/or the second smoothing capacitor 16 and/or the third smoothing capacitor 19 may be precharged via the precharge circuit 37. If the smoothing capacitors 14, 16, 19 are precharged, that is to say brought to the voltage of the mains 3 as a result, a first mains disconnection contactor 38 of the first phase conductor 7, connected in parallel with the precharge circuit 37, is closed. After the first mains disconnection contactor 38 has been closed, the current flows substantially via the first mains disconnection contactor 38 and no longer via the precharge circuit 37. The first mains disconnection contactor 38 is designed for 16 A according to the exemplary embodiment. The first mains disconnection contactor 38 may however also be designed for a wide variety of other currents.

The first phase conductor 7 is furthermore electrically connected to the second phase conductor 8 via a first cross-connection line 25. The first cross-connection line 25 has a second mains disconnection contactor 26. A further precharge circuit of the first cross-connection line 25 may be arranged in parallel with the second mains disconnection contactor 26. According to the exemplary embodiment, the first cross-connection switch is designed identically to the first mains disconnection contactor 38. The further precharge circuit is furthermore designed in particular identically to the precharge circuit 37.

The first phase conductor 7 is furthermore electrically connected to the third phase conductor 9 by a second cross-connection line 28. The second cross-connection line 28 has a second cross-connection switch 29 and may also have yet another precharge circuit, not illustrated. As shown, the second cross-connection switch 29 and the yet another precharge circuit are arranged in parallel with one another. The precharge circuits may be identical. The cross-connection switches 26, 29 may also be identical.

The second phase conductor 8 has a second mains disconnection contactor 31. The third phase conductor 9 has a third mains disconnection contactor 32. The mains disconnection contactors 38, 31, 32 may be identical. The first phase conductor has a mains connection 33. An electrical connection between a mains connection 36 of the neutral conductor 6 and the first branch 10, the second branch 11 and the third branch 12 may be interrupted by the first mains disconnection contactor 38. An electrical connection between a mains connection 34 of the second phase conductor 8 and the second branch 11 may be interrupted by the second mains disconnection contactor 31. An electrical connection between a mains connection 35 of the third phase conductor 9 and the third branch 12 may be interrupted by the third mains disconnection contactor 32. The mains connections 33, 34, 35 may be designed for example as pins of a plug. The plug may be designed for example as a three-phase plug that has three pins as the mains connections 33, 34, 35 of the phase conductors 7, 8, 9 and a further pin as a mains connection 36 of the neutral conductor 6.

As shown, only the mains connection 33 of the first phase conductor and the mains connection 36 of the neutral conductor 6 are connected directly to the mains 3. As shown, the mains connection 34 of the second phase conductor 8 and the mains connection 35 of the third phase conductor 9 are not electrically connected to the mains 3, but are suitable for being connected thereto if the appropriate connection is provided on the mains side.

The first cross-connection line 25 makes it possible for the second branch 11 to be supplied with power if only the mains connection 33 of the first phase conductor 7 is connected to the mains 3 while the mains connection 34 of the second phase conductor 8 is not connected to the mains 3. Similarly, the third branch 12 may be supplied with power via the second cross-connection line 28 if only the mains connection 33 of the first phase conductor 7 is electrically connected to the mains 3 and neither the mains connection 34 of the second phase conductor 8 and/or the mains connection 35 of the third phase conductor 9 is connected to the mains 3.

Figure 3:
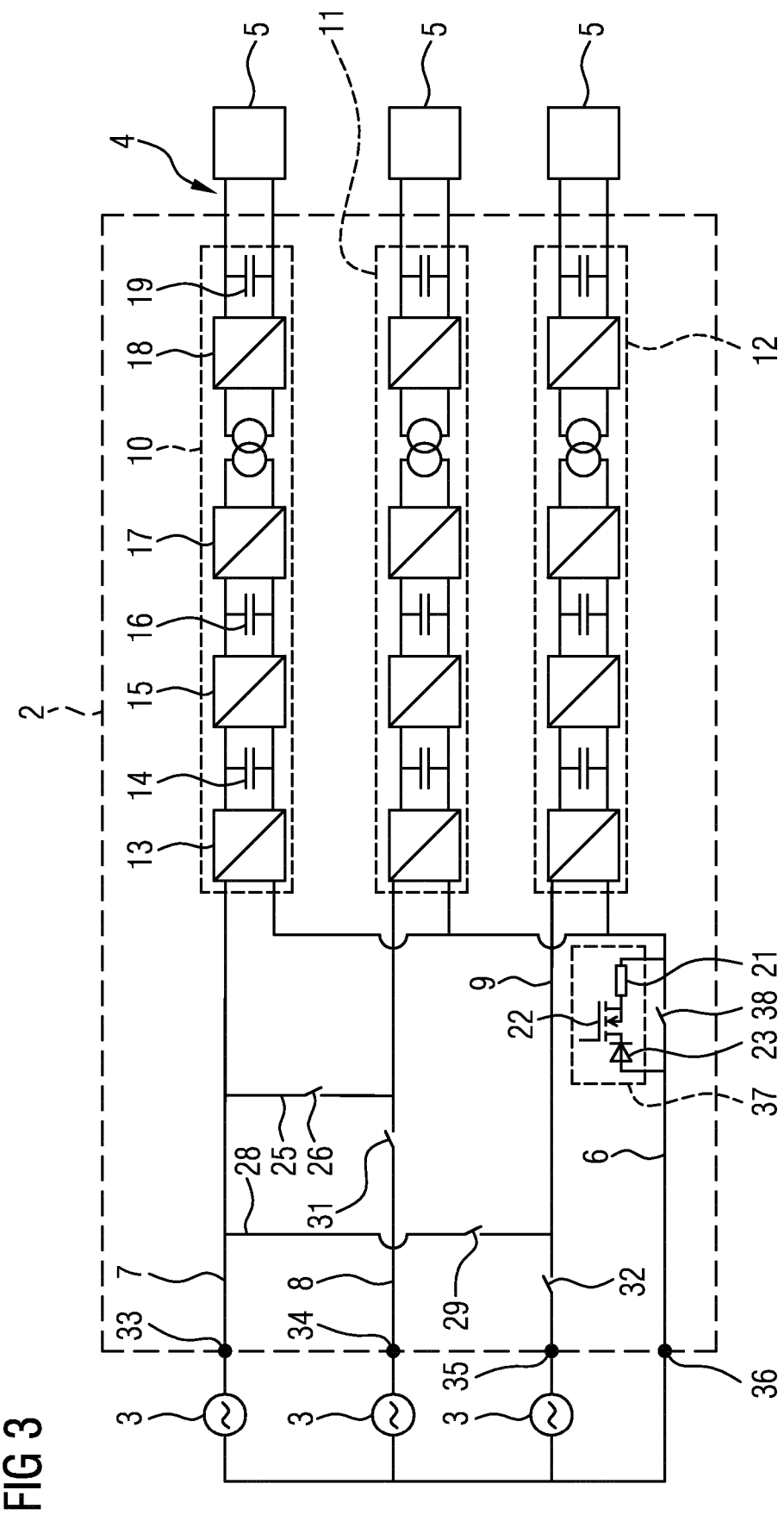
FIG. 3 shows a schematic illustration of a further exemplary embodiment of an AC charging device incorporating teachings of the present disclosure with the precharge circuit, which is arranged in the neutral conductor.

FIG. 3 shows a further exemplary embodiment of the AC charging device 2 designed analogously to the embodiment shown in FIG. 2, wherein the precharge circuit 37 has the transistor 22 and the diode 23, which are connected in series.

Figure 4:
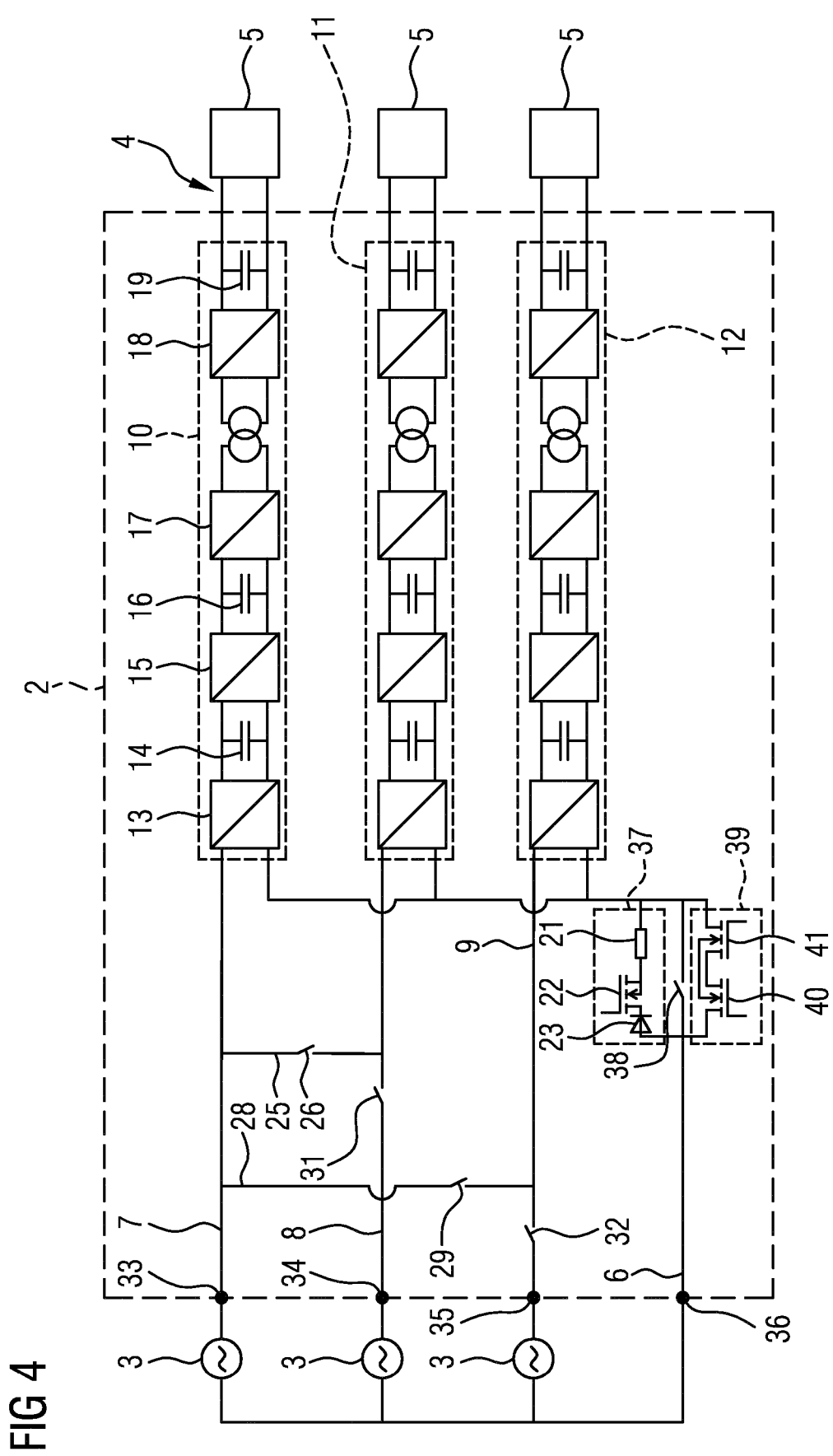
FIG. 4 shows a schematic illustration of a further exemplary embodiment of an AC charging device incorporating teachings of the present disclosure with a mains disconnection circuit, which has two transistors connected to one another in antiseries.

FIG. 4 shows a further exemplary embodiment of the AC charging device 2. The AC charging device 2 shown in FIG. 4 is designed analogously to the exemplary embodiment according to FIG. 3, wherein the neutral conductor 6 has a first mains disconnection contactor 38 and a mains disconnection circuit 39 is arranged in parallel with the first mains disconnection contactor 38. As shown, the mains disconnection circuit 39 is likewise arranged in parallel with the precharge circuit 37. As a result of the mains disconnection circuit 39, the first mains disconnection contactor 38 is designed in particular without a spark extinguishing chamber. If the AC charging device 2 is connected to the mains 3 and the first mains disconnection contactor 38 is opened, then the current flows through the higher-resistance mains disconnection circuit 39, as a result of which the arc that normally occurs without the mains disconnection circuit 39 does not occur.

As shown, the mains disconnection circuit 39 has a first transistor 40 and a second transistor 41. The first transistor 40 and the second transistor 41 are connected to one another in antiseries.

Figure 5:
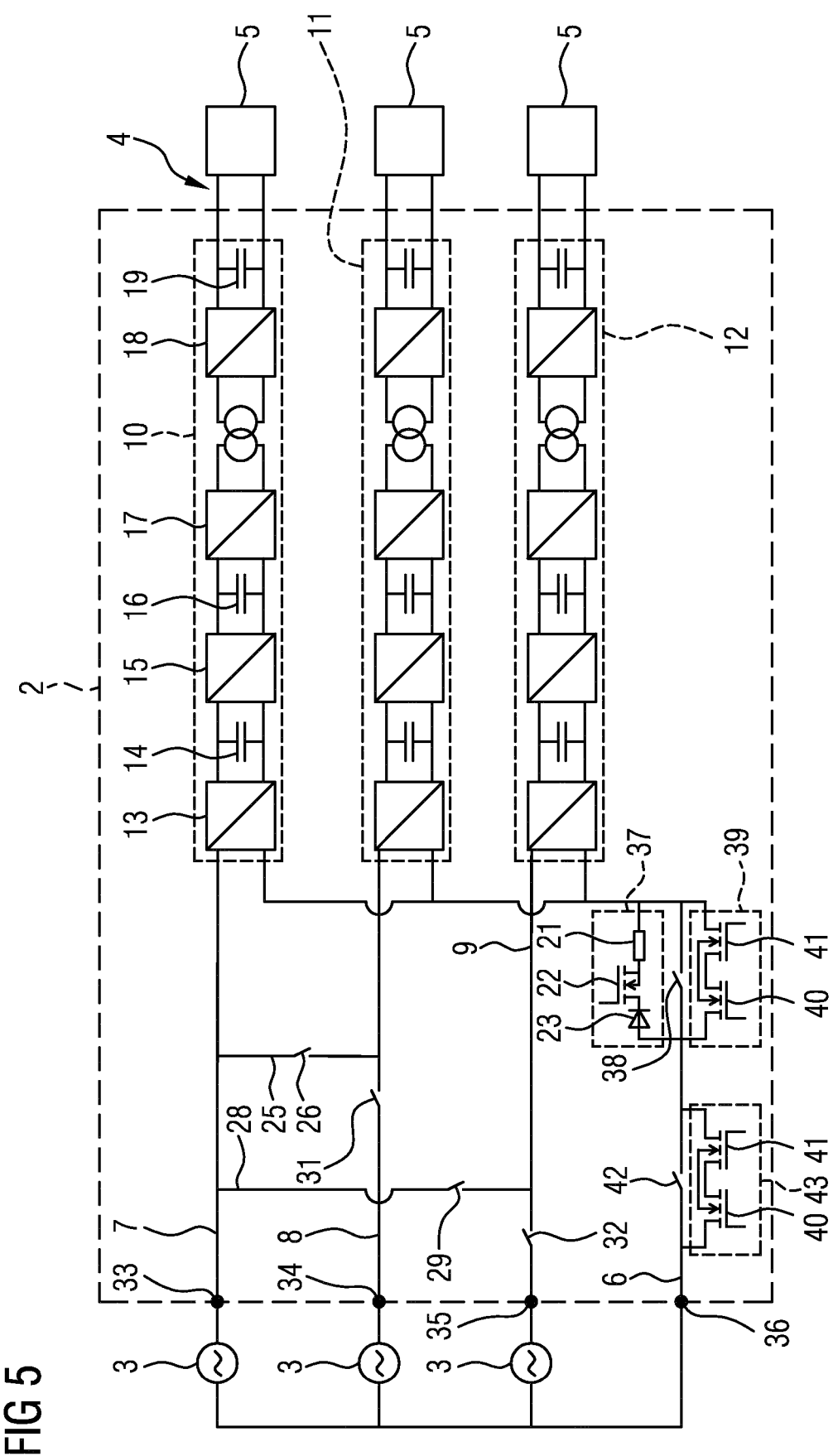
FIG. 5 shows a schematic illustration of a further exemplary embodiment of an AC charging device incorporating teachings of the present disclosure with the mains disconnection circuit, which has a transistor and a diode.

FIG. 5 shows a further exemplary embodiment of the AC charging device 2 designed analogously to the exemplary embodiment shown in FIG. 4, wherein the neutral conductor 6 has a further mains disconnection contactor 42 and a further mains disconnection circuit 43 is arranged in parallel with the further mains disconnection contactor 42. The further mains disconnection contactor 42 is arranged in series with the first mains disconnection contactor 38.

Figure 6:
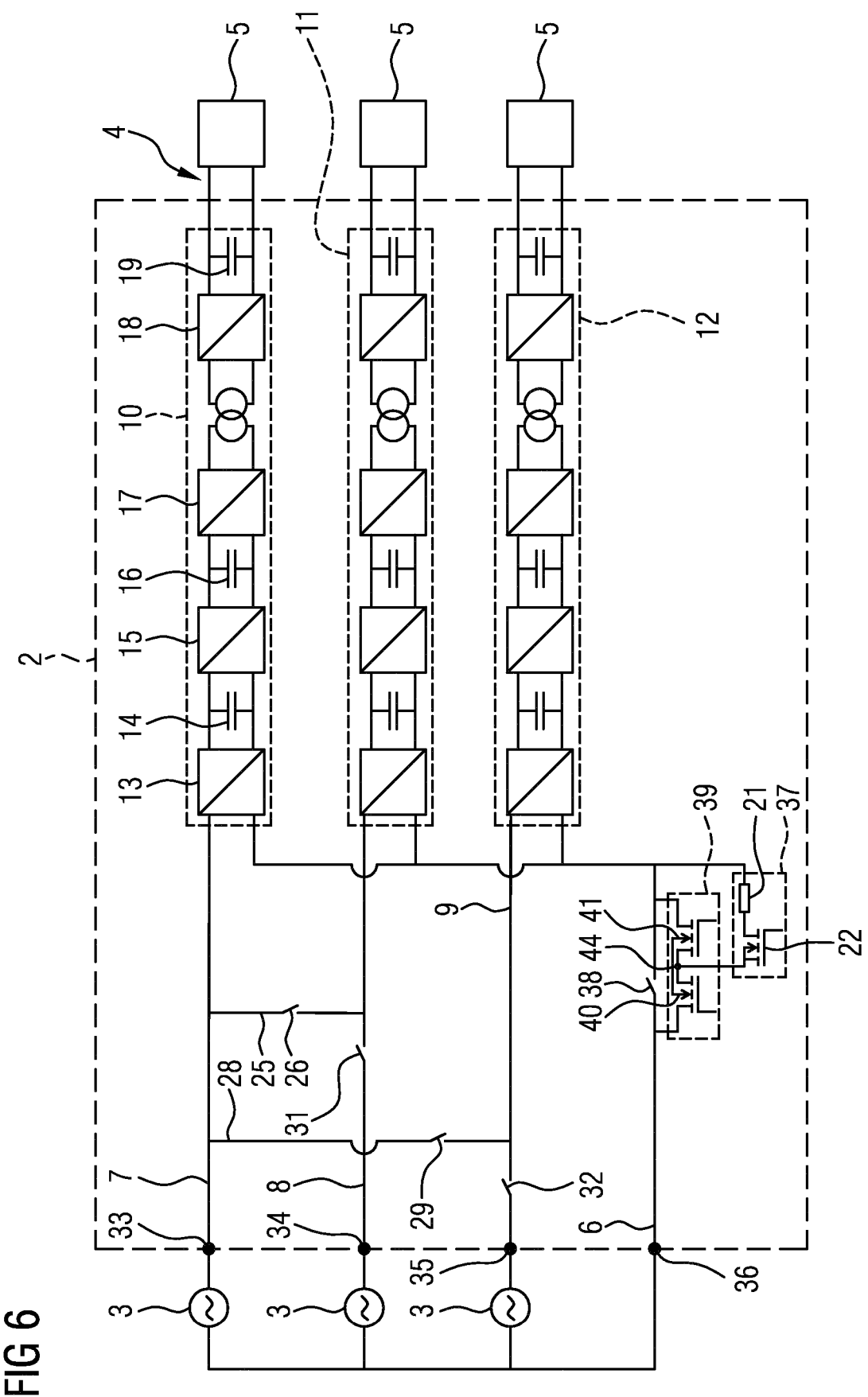
FIG. 6 shows a schematic illustration of a further exemplary embodiment of an AC charging device incorporating teachings of the present disclosure with a connection point between two semiconductor elements of the mains disconnection circuit and the precharge circuit connected to the connection point.

FIG. 6 shows a further exemplary embodiment of the AC charging device 2 designed analogously to the exemplary embodiment shown in FIG. 5, wherein a connection point 44 is between the two semiconductor elements or transistors 40, 41 of the mains disconnection circuit 39 and the precharge circuit 37 is electrically connected to the connection point 44. The first transistor 40 is thus connected in series with the transistor 22 of the precharge circuit 37. As shown, the precharge circuit 37 does not have a diode 23, but rather only the precharge resistor 21 and the transistor 22.

Figure 7:
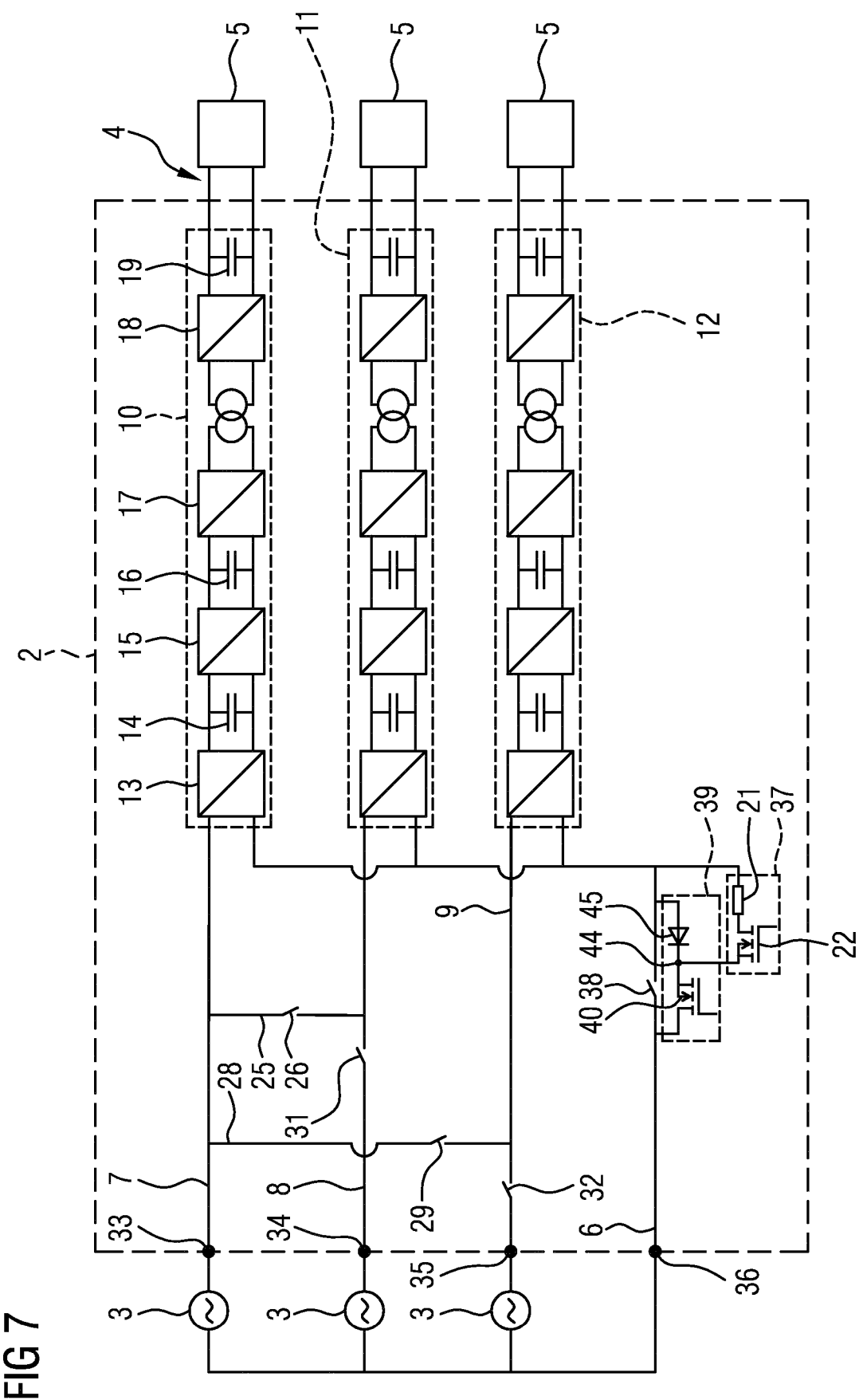
FIG. 7 shows a schematic illustration of a further exemplary embodiment of an AC charging device incorporating teachings of the present disclosure with the mains disconnection circuit with a transistor and a diode.

FIG. 7 shows a further exemplary embodiment of the AC charging device 2 designed analogously to the exemplary embodiment shown in FIG. 6. However, the mains disconnection circuit 39 has a diode 45 instead of the second transistor 41. In some embodiments, as an alternative to the second transistor 41, the first transistor 40 may also be replaced by the diode 45. The mains disconnection circuit 39 may thus be formed by the diode 45 and the second transistor 41.

LIST OF REFERENCE SIGNS

1 Motor vehicle
2 AC charging device
3 Mains
4 On-board electrical system
5 Traction battery
6 Neutral conductor
7 First phase conductor
8 Second phase conductor
9 Third phase conductor
10 First branch
11 Second branch
12 Third branch
13 First rectifier
14 First smoothing capacitor
15 DC-DC voltage converter
16 Second smoothing capacitor
17 Inverter
18 Second rectifier
19 Third smoothing capacitor
21 Precharge resistor
22 Transistor
23 Diode
25 First cross-connection line
26 First cross-connection switch
28 Second cross-connection line
29 Second cross-connection switch
31 Second mains disconnection contactor
32 Third mains disconnection contactor
33 Mains connection of the first phase conductor
34 Mains connection of the second phase conductor
35 Mains connection of the third phase conductor
36 Mains connection of the neutral conductor
37 Precharge circuit
38 First mains disconnection contactor
39 Mains disconnection switch
40 First transistor of the mains disconnection switch
41 Second transistor of the mains disconnection switch
42 Further mains disconnection contactor
43 Further mains disconnection switch
44 Connecting point
45 Diode

What is claimed is:

1. An alternating current (AC) charging device for a motor vehicle, the AC charging device comprising:
   a neutral conductor;
   a phase conductor;
   a rectifier;
   wherein the neutral conductor and the phase conductor are connected to the rectifier;
   a smoothing capacitor electrically connected to the rectifier;
   a mains connection;
   a precharge circuit arranged between the mains connection and the smoothing capacitor, the precharge circuit precharging the smoothing capacitor; and
   a second phase conductor electrically connected to the phase conductor by a cross-connection line;
   wherein the precharge circuit is disposed in the neutral conductor.

2. The AC charging device as claimed in claim 1, wherein the precharge circuit includes a transistor connected in series with a precharge resistor.

3. The AC charging device as claimed in claim 1, wherein the precharge circuit includes a series-connected diode.

4. The AC charging device as claimed in claim 1, wherein the cross-connection line includes a cross-connection switch for disconnecting the phase conductor from the second phase conductor.

5. The AC charging device as claimed in claim 1, further comprising a second precharge circuit identical to the precharge circuit, the second precharge circuit disposed in the cross-connection line or in a phase conductor.

6. The AC charging device as claimed in claim 1, further comprising:
   a mains disconnection contactor between the mains connection and the rectifier; and
   a mains disconnection circuit in parallel with the mains disconnection contactor.

7. The AC charging device as claimed in claim 6, wherein the precharge circuit is in parallel with the mains disconnection contactor.

8. The AC charging device as claimed in claim 6, wherein the precharge circuit is in parallel with the mains disconnection circuit.

9. The AC charging device as claimed in claim 6, wherein the mains disconnection circuit comprises two semiconductor elements.

10. The AC charging device as claimed in claim 9, wherein the two semiconductor elements comprise two transistors connected to one another in antiseries.

11. The AC charging device as claimed in claim 9, wherein one semiconductor element of the two semiconductor elements comprises a diode.

12. The AC charging device as claimed in claim 6, wherein the precharge circuit is electrically connected to a connection point between the two semiconductor elements.

13. The AC charging device as claimed in claim 1, further comprising:
   a mains disconnection contactor between the mains connection and the rectifier; and
   a mains disconnection circuit in parallel with the mains disconnection contactor;
   wherein the mains disconnection contactor is in series with the precharge circuit.

14. A method for operating an alternating current (AC) charging device for a motor vehicle, the method comprising:
   opening a mains disconnection contactor of the AC charging device, electrically connecting a mains to a rectifier of the AC charging device;
   applying voltage from the mains to the AC charging device, wherein a phase conductor and a second phase conductor are electrically connected to one another by a cross-connection line;
   precharging a smoothing capacitor through a precharge circuit disposed in a neutral conductor of the AC charging device; and
   closing the mains disconnection contactor once the smoothing capacitor is precharged.

* * * * *